United States Patent [19]

Cosnard et al.

[11] Patent Number: 5,424,835
[45] Date of Patent: Jun. 13, 1995

[54] HIGH-RESOLUTION COMPACT OPTICAL SENSOR FOR SCANNING THREE-DIMENSIONAL SHAPES

[75] Inventors: Eric Cosnard, La Peyrouse-Fossat; Jan Steuperaert, Le Faget, both of France

[73] Assignee: Kreon Industrie, France

[21] Appl. No.: 996,899

[22] Filed: Dec. 28, 1992

[30] Foreign Application Priority Data

Dec. 30, 1991 [FR] France ................................ 91 16305

[51] Int. Cl.$^6$ ............................................ G01B 11/24
[52] U.S. Cl. ............................................ 356/376
[58] Field of Search ............... 356/376; 359/850, 857, 359/861

[56] References Cited

U.S. PATENT DOCUMENTS

| | | | |
|---|---|---|---|
| 2,961,918 | 10/1958 | Nadig et al. | 359/850 |
| 3,498,693 | 3/1970 | Fein et al. | 359/857 |
| 3,506,334 | 4/1970 | Korpel | 359/857 |
| 4,815,842 | 3/1989 | Flint et al. | 356/244 |
| 5,027,424 | 6/1991 | Yamazaki et al. | 359/850 |
| 5,076,698 | 12/1991 | Smith et al. | 356/376 |
| 5,270,560 | 12/1993 | Cheng | 356/376 |

FOREIGN PATENT DOCUMENTS

9009561 2/1990 WIPO.

OTHER PUBLICATIONS

Patent Abstracts of Japan, 1944, vol. 9, No. 221 (p. 386), Sep. 7, 1985 and Nippon Denshin Denwa Kosha, JP-A-60 709 204, May 7, 1985.

*Primary Examiner*—Richard A. Rosenberger
*Attorney, Agent, or Firm*—Andrus, Sceales, Starke & Sawall

[57] ABSTRACT

An optical sensor for three dimensional shapes includes a laser that produces a lamellar plane beam which illuminates the surface of an object. The lamellar plane beam produces a curvilinear luminous trace that is scanned by at least one video camera, to produce information that is then converted into digital data representing pixel coordinates. The sensor includes a lightbox having a common housing that is positioned a short distance above the object to be scanned. The lightbox housing also includes a laser source that produces a collimated rectilinear beam and an optical device for converting the rectilinear beam into the lamellar plane beam. The lightbox housing also includes a device for lengthening the optical path of the lamellar plane beam, comprising two fixed plane mirrors in face to face relationship to produce a plurality of reflections between a beam entry point and a beam exit point of the lightbox. The small physical distance between the housing and the object is compensated by a virtual optical distance so that there is a correlative increase in the depth of field of the usable region of the lamellar plane beam at the beam exit point from the housing.

4 Claims, 5 Drawing Sheets

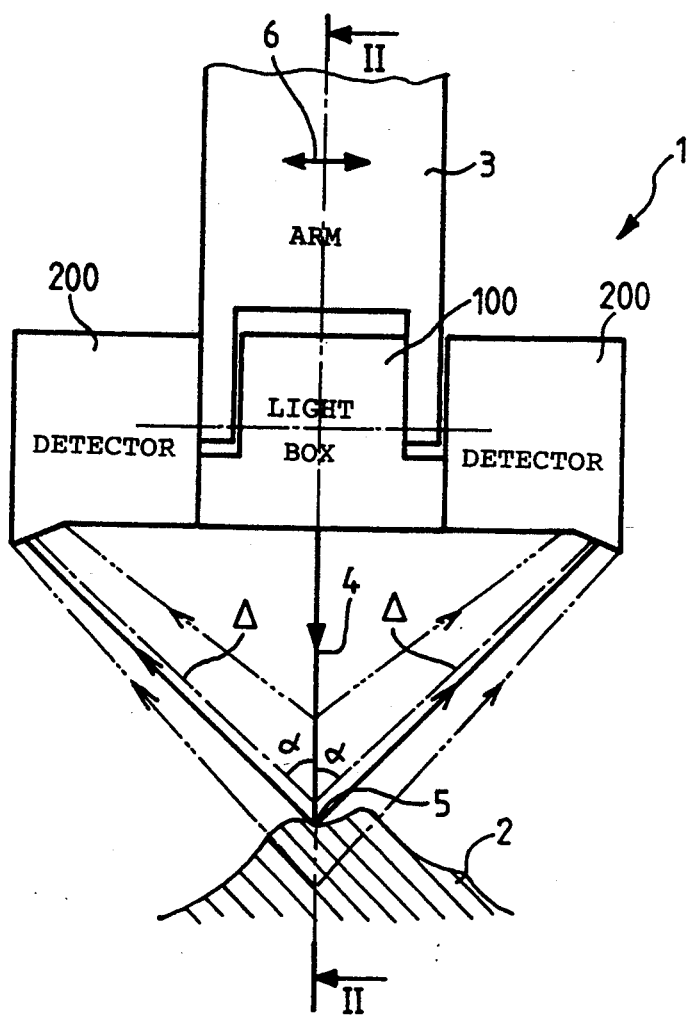
FIG_1
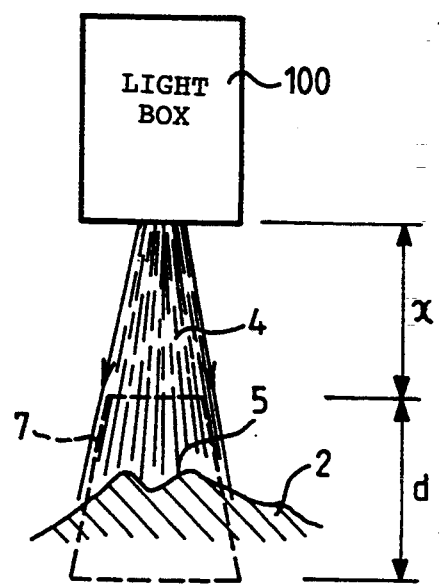
FIG_2

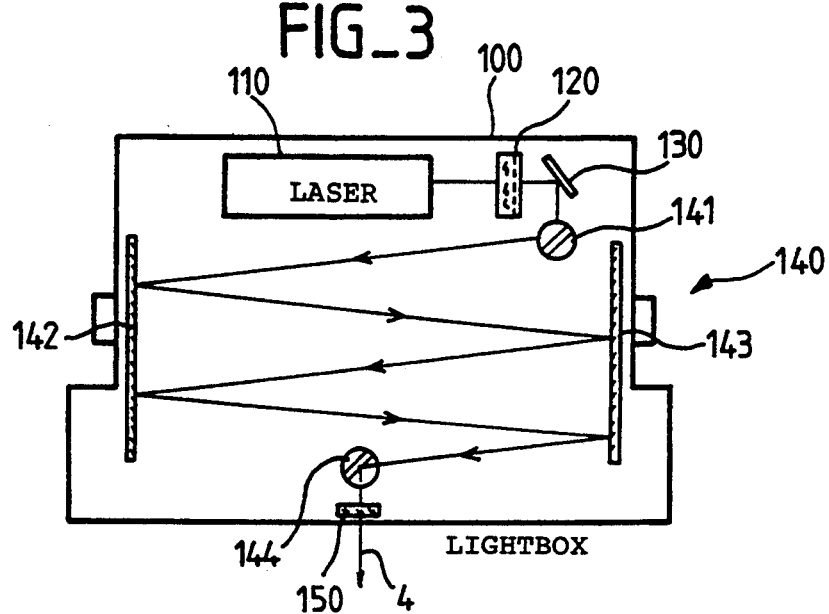
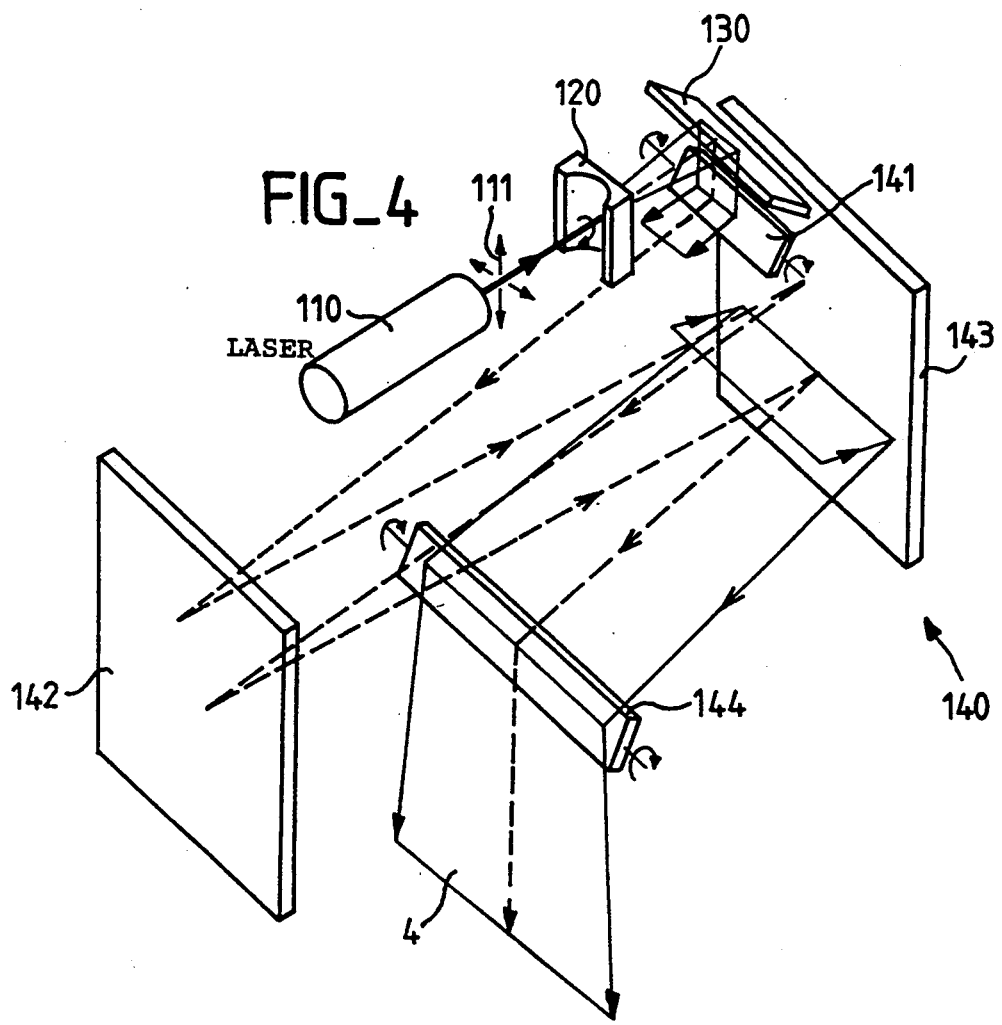

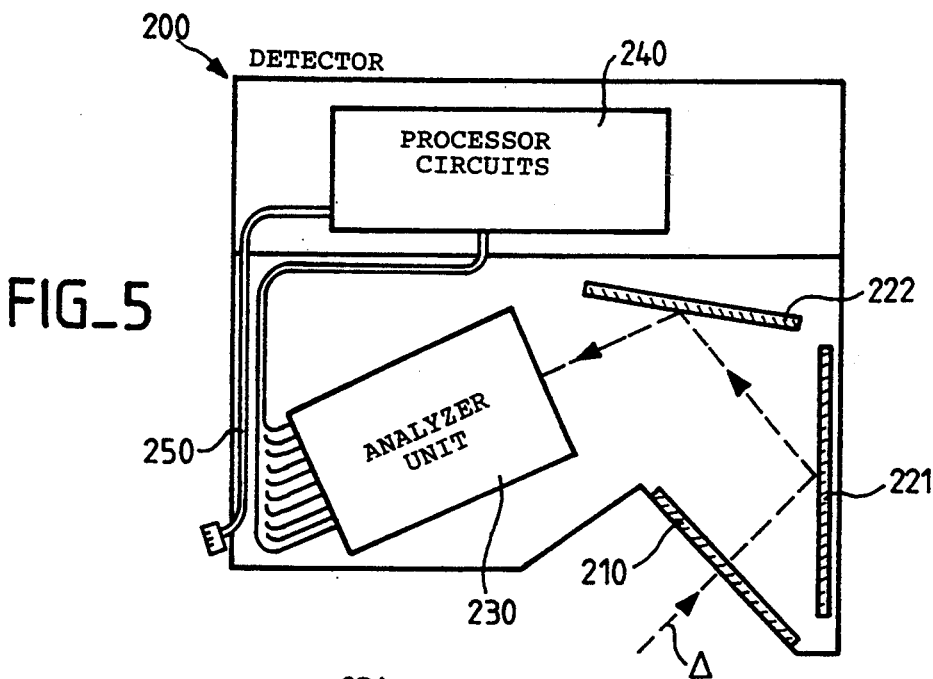
FIG_5
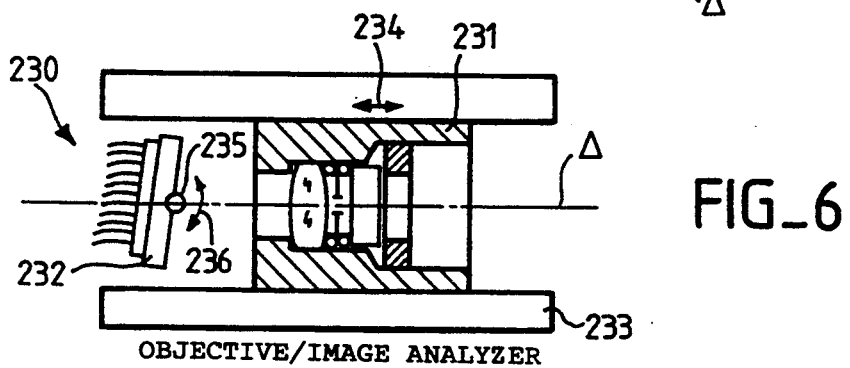
FIG_6
OBJECTIVE/IMAGE ANALYZER
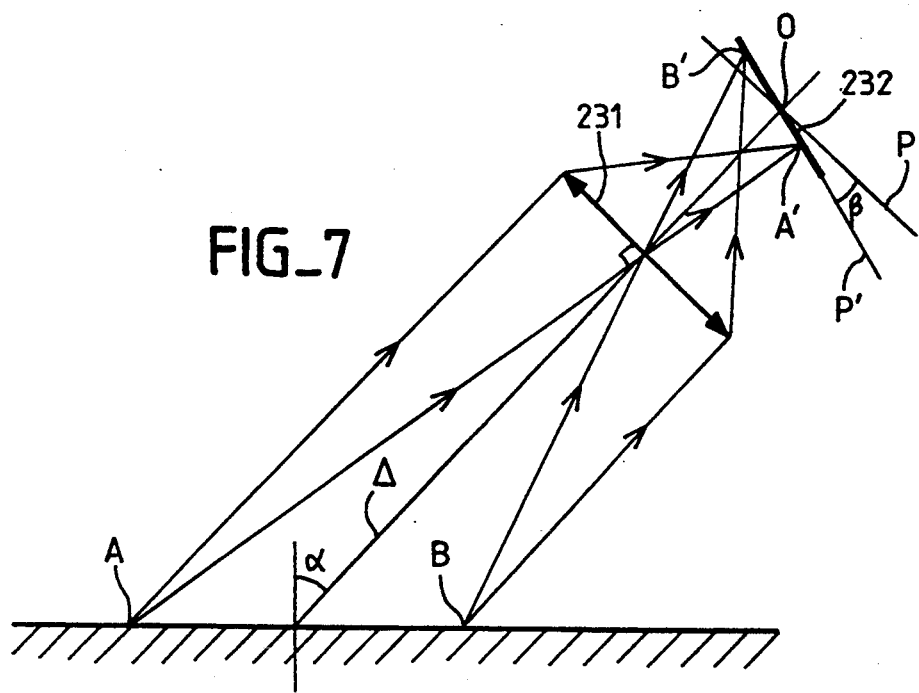
FIG_7

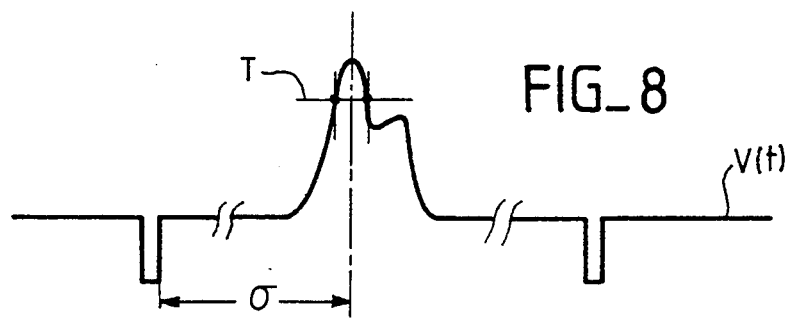
FIG_8
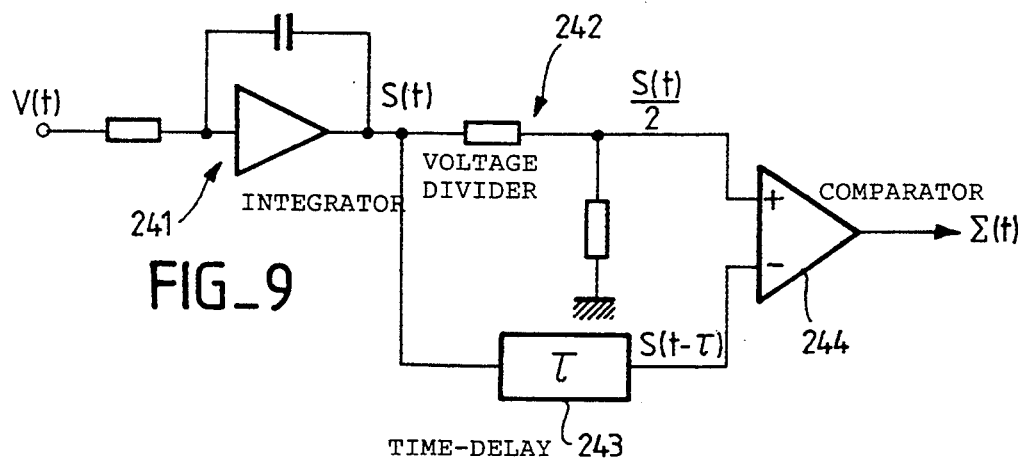
FIG_9
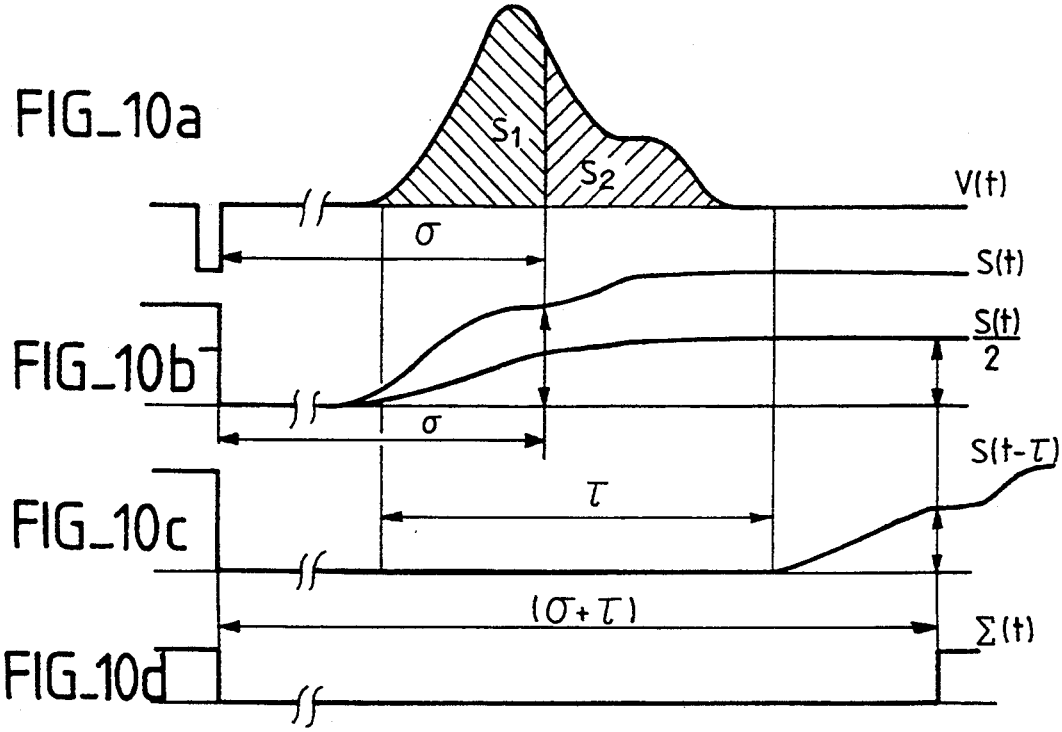

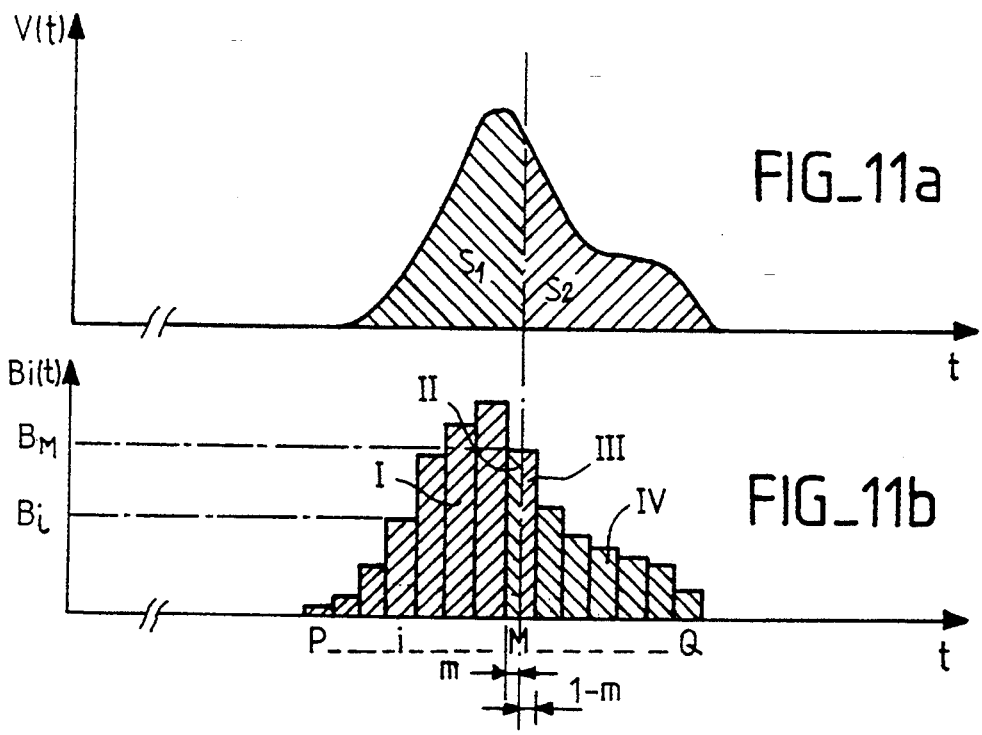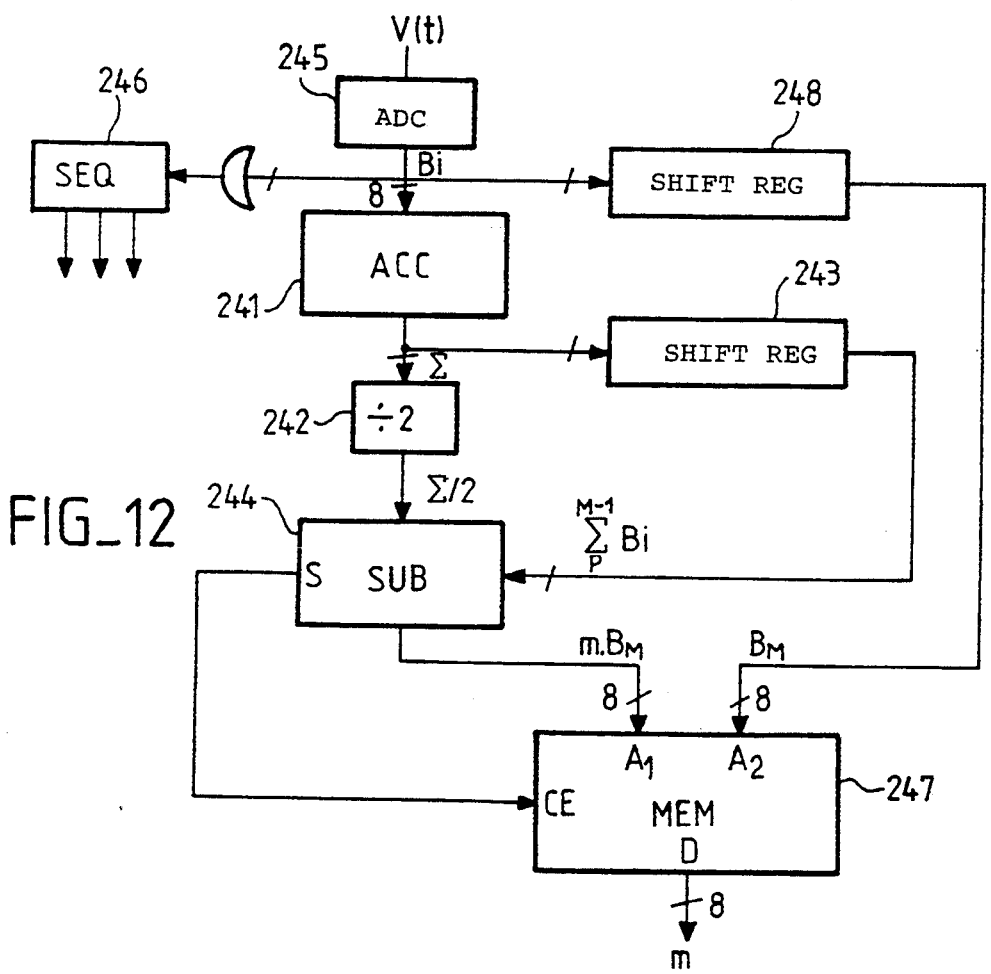

HIGH-RESOLUTION COMPACT OPTICAL SENSOR FOR SCANNING THREE-DIMENSIONAL SHAPES

BACKGROUND OF THE INVENTION

1. Field of the invention

The invention concerns the acquisition and digitization in three dimensions of the shape of any object by means of systems comprising an optical sensor with a source of laser radiation and one or more cameras scanning the trace of the laser beam on the object under study.

2. Description of the Prior Art

A technique of this kind is described in detail in the documents FR-A-2 627 047, FR-A-2 642 833 and FR-A-2 629 198.

To be more precise, this technique generates a "laser plane", that is to say a sectoral lamellar beam which is very thin but whose width covers all of the object to be scanned, with one or two cameras viewing this plane at two different angles of incidence. The system is placed at the end of a mobile manipulator arm, the arm of a numerically controlled machine tool for example, to scan the laser plane over the part to acquire the surface of the part in three dimensions progressively. The scanning may be achieved by pivoting or by movement in translation of the sensor relative to the part or by keeping the sensor fixed in position and moving the part relative to it, in which case the part is mounted on a remote controlled multi-axis table, for example.

The sensors used in this technique until now have been relatively bulky, fragile and complex.

One object of the invention is to propose a sensor structure enabling the sensor to be significantly miniaturized whilst retaining or even increasing its accuracy and its resolution (the "resolution" being the pixel size of the system and the "accuracy" allowing for the digitization and reconstitution stages; it will be shown later that the accuracy of positioning can be better than one pixel given various processing operations carried out during the laser trace analysis stage).

The benefit of a miniaturized sensor, apart from its general convenience, is that it can be used in even a highly restricted space, for small parts, on surfaces that are difficult of access, etc, in other words whenever great accuracy is required in a reduced area.

However, in this case the sensor is much closer to the part to be scanned and this gives rise to a number of new problems, especially that of the depth of field, which decreases as the sensor moves closer to the object.

At present He-Ne laser sensors are adjusted with a focus about one meter from the source and therefore with significant "backoff" (which is indispensable in any event given the relatively large size of the helium-neon laser and its various associated units). As used herein, the term "backoff" refers to the distance between the laser sensor and the object to be scanned.

Combined with a long focal length, this large backoff can produce an extremely fine trace with a large depth of field, typically a lamellar beam less than 0.2 mm thick over a depth of field of 100 mm.

What is more, as the lamellar beam is produced by static means (usually a cylindrical lens), the spread of the beam in combination with the large backoff produces a relatively low local energy density (in the order of 1 $\mu$W/mm$^2$), which means that the beam is not hazardous to the operator.

On the other hand, although it is possible to miniaturize the sensor (in particular by using a laser diode in place of the He-Ne laser), if it is not possible or desirable to set back the sensor from the object the depth of field problem arises because of the focussing at a much shorter distance (typically 10 cm rather than 1 m), with a corresponding effect on the thickness of the trace and therefore on resolution and accuracy.

Because the energy density varies in inverse proportion to the distance, it increases very significantly to the point where the beam is hazardous should it impinge on the eye of an operator near the object.

An object of the invention is to retain the advantages of current sensors despite miniaturization and the much smaller physical backoff relative to the object.

The basic principle of the invention is to create a virtual backoff of the source within the sensor to procure conditions that are substantially the same as those for a long focus beam, so compensating the small physical backoff due to the configuration of the sensor-object system.

SUMMARY OF THE INVENTION

The invention consists in an optical sensor for three dimensional shapes comprising a laser source adapted to produce a lamellar plane beam illuminating the surface of an object so as to produce thereon a curvilinear luminous trace scanned by at least one video camera producing information converted into digital data representing pixel coordinates, the sensor comprising a lightbox comprising in a common housing adapted to be disposed a short distance above the object to be scanned:

said laser source adapted to produce a collimated rectilinear beam, optical means for converting said rectilinear beam into a lamellar plane beam, and means for lengthening the optical path of said beam comprising two fixed plane mirrors in face to face relationship to produce a plurality of reflections between a beam entry point and a beam exit point, whereby the small physical backoff between the casing and the object is compensated by a virtual optical backoff so that there is a correlative increase in the depth of field of the usable region of the lamellar plane beam at the exit from the casing. As used herein, the term "virtual optical backoff" refers to a simulated distance between the sensor and the object to be scanned that produces a depth of field corresponding to the depth of field produced by a larger physical distance between the sensor and the object.

The entry and exit points advantageously comprise optical means for adjusting the beam angle of incidence to vary the number of reflections between the two mirrors in face to face relationship, and the optical means for converting the rectilinear beam into a lamellar plane beam are static means.

The sensor may further comprise at least one detector unit adjoining the lightbox and provided with a photoelectric image analyzer device and objective lens means in front of said image analyzer device.

In this case, according to an advantageous feature of the invention, means are provided for tilting the image analyzer device relative to the objective lens means.

According to another advantageous feature of the invention, there is further provided an electronic circuit for extracting data representing the position of the trace of the laser beam on each image line produced by the image analyzer device, this circuit comprising: an integrator stage receiving at its input an electrical signal representing the received luminous intensity, varying according to the position on the scanned line and delivering at its output an increasing signal representing the cumulative luminous energy received, a divider stage receiving at its input the energy signal supplied by the integrator stage, a time-delay stage receiving at its input the energy signal supplied by the integrator stage, and a comparator stage receiving on respective inputs the output signals of the divider stage and the time-delay stage, a change of state of the comparator stage defining the position of the mid-point of the trace of the laser beam on the image scanning line.

One embodiment of the invention will now be described by way of example with reference to the appended drawings.

BRIEF DESCRIPTION OF THE DRAWINGS

FIG. 1 is a front elevation view of a sensor in accordance with the invention with a lightbox and two adjoining detectors, the assembly being mounted at the end of a mobile manipulator arm.

FIG. 2 is a side view of the same assembly as seen on the line II—II in FIG. 1.

FIG. 3 is a diagrammatic cross-section view of the lightbox of the sensor.

FIG. 4 is a perspective view showing the various optical components of the lightbox.

FIG. 5 is a diagrammatic cross-section view of one of the detectors of the sensor.

FIG. 6 is a diagrammatic cross-section view of the objective lens/scanning device of the detector from FIG. 5.

FIG. 7 is a diagram showing how sharpness and depth of field defects are compensated by a system for tilting the photo-electric device of the detector.

FIG. 8 shows the general form of the video signal of a scanning line at the output of the photo-electric device.

FIG. 9 is a block diagram of a circuit for analyzing this signal to extract data representative of the position of the trace of the laser beam.

FIGS. 10a, 10b, 10c and 10d are timing diagrams showing various signals in the circuit from FIG. 9.

FIGS. 11a, 11b and 12 show a digital embodiment of the signal analyzer system of which FIG. 9 shows an analog version.

DETAILED DESCRIPTION OF THE INVENTION

FIG. 1 shows a sensor 1 in accordance with the invention.

It is disposed near a part 2 to be scanned whose surface shape is to be acquired and digitized. The sensor 1 is mounted at the end of a manipulator arm 3, the arm of a numerically controlled machine tool for example, and comprises a central member 100 in the form of a lightbox emitting a lamellar plane laser beam 4, that is to say a relatively thin beam (see FIG. 1) of relatively great width (see FIG. 2). Where the beam impinges on the surface of the part a curvilinear luminous trace 5 appears which is scanned by one or (preferably) two detectors 200 each comprising a camera and electronic circuits for digitizing and analyzing the camera image. The two detectors 200 are advantageously produced in the form of units adjoining the lightbox 100 and disposed one on each side of the latter to constitute a single assembly (the sensor 1) carried by the manipulator arm 3. The use of two cameras enables a significant reduction in the time to acquire the three-dimensional shape but is not an essential feature of the invention, the sensor feasibly comprising only one camera.

The sensor carries out a scan to acquire all of the shape of the part. In the example shown this scan is a scan in translation achieved by moving the manipulator arm 3 in a direction (shown by the arrow 6) perpendicular to the plane of the lamellar beam, typically with a rate of advance of two to three steps per second, each step being a distance in the order of 0.1 to 0.5 mm depending on the required acquisition accuracy. The pixel size is typically $50 \times 50$ µm and this can be reduced by electronic smoothing to $20 \times 20$ µm.

Note that as an alternative to this it is possible to achieve the sensor/part relative movement by moving the part and keeping the sensor fixed in position or to achieve scanning by any combination of movement in translation and rotation.

The invention is more particularly directed to solving optical problems, especially the depth of field problem which occur when the sensor is very close to the part, that is to say when the ratio $d/x$ is high where d is the depth of the usable field 7 (FIG. 2) and x is the minimal distance between the sensor and the object. It will be seen that this ratio $d/x$ can greatly exceed unity whereas values in the order of 0.1 to 0.2 apply in the prior art techniques used until now.

FIGS. 3 and 4 show the structure of the lightbox 100 (FIG. 4 shows only the optical components contributing to formation of the beam).

The lightbox essentially comprises a laser source 110, for example a laser diode emitting a thin cylindrical collimated beam of visible light with a power rating in the order of 3 mW. The beam impinges on a cylindrical lens 120 which converts the thin cylindrical beam into a flat beam (see FIG. 4). Means 111 are provided for adjusting the exact position of the laser source 110 on two axes at right angles to position the laser source 110 exactly to centre the light spot perfectly on the cylindrical lens 120. The cylindrical lens 120 comprises means for fine adjustment in rotation about its optical axis (an adjustment in the order of $\pm 5°$ or $\pm 10°$) to adjust the inclination of the widened beam (the lamellar beam) to its axis.

The beam is reflected from a mirror 130 towards an optical system 140 which increases the optical path of the beam and which will now be described in detail.

The system 140 comprises an adjustable mirror 141 directing the lamellar beam produced by the components described previously towards a first mirror 142 of a set of two parallel plane mirrors 142, 143. By virtue of the familiar "parallel mirrors" phenomenon, the beam is reflected several times which increases its path length and simultaneously causes a progressive increase in its width, as can be seen in FIG. 4 (in FIG. 4 the dashed line shows the centre of the lamellar beam which to make the diagram clearer is shown only at the start and at the end of these successive reflections).

After the final reflection the beam is deflected by a mirror 144 towards a window 150 through which it impinges on the object to be scanned.

The adjustable mirror 141 varies the number of successive reflections by varying the angle of incidence with which the beam first impinges on the mirror 142. The system is typically adjusted to obtain at least four successive reflections, although this number is not in any way limiting on the invention.

The mirror 144 adjusts the perpendicularity of the beam as it leaves the lightbox.

Note incidentally that the lamellar beam is generated entirely statically without any moving mirror or like member, which has many advantages: elimination of the hazard to the operator (the light energy is spread over the width of the beam instead of being concentrated at an intense moving spot), absence of fragile mechanical parts, no requirement for synchronization, great accuracy (freedom from vibration, no parts that can go out of adjustment, etc).

All the mirrors used in the lightbox are of course optical grade rectified mirrors and the lightbox is hermetically sealed to protect the path of the beam from dust and smoke.

In a practical embodiment that has been constructed the lightbox is 70×85×140 mm and produces at a distance x=100 mm from the part a laser field with d=150 mm (using the FIG. 2 notation). The trapezoidal field 7 in FIG. 2 then has a shorter side of 65 mm and a longer side of 95 mm. The lengthening of the optical path produces a virtual backoff in the order of 1 m, the distance to which the laser beam focus is adjusted. The exact focus is approximately in the lower third of the trapezoidal field so that the beam thickness is approximately the same at the start and end of the field. The beam thickness at the start and end of the field is therefore in the order of 0.3 mm, reducing to 0.2 mm at the focus: the depth of field is therefore excellent despite the very short physical backoff of the sensor and the very wide laser beam.

The detector part of the sensor will now be described.

FIG. 5 is a diagrammatic representation of the internal structure of each of the two detectors 200 which comprise an entry window 210 providing a direct view of the trace formed where the laser beam impinges on the part. An image of this trace is fed via a set of mirrors 221, 222 to an analyzer unit 230 which converts the image into a digitized electronic signal which is processed by circuits 240 before it is sent over a connection 250 to an electronic data processing system for processing and reconstituting the image. The dimensions of each detector are 100×100×70 mm, for example.

The unit 230 is shown in more detail in FIG. 6 and essentially comprises an objective lens system 231 comprising a lens, a diaphragm and a filter placed in front of a photo-electric imaging device 232 such as a charge-coupled device (CCD). Focussing is adjusted by moving the objective lens system 231 in translation within its tube 233, as shown by the arrow 234.

The CCD (or other imaging device) is adapted to tilt about an axis 235 perpendicular to the optical axis Δ; this tilting movement is shown by the arrow 236.

As shown in FIG. 7, this tilting device is able to compensate for defective focussing due to the proximity of the sensor and the object. Two points A and B on an object on the same horizontal level produce respective images A' and B', the farther point A producing an image in front of the normal focal plane P of the sensor (that is to say the focal plane perpendicular to the optical axis Δ) while the nearer point produces an image behind this same focal plane.

The tilt device is specifically intended to compensate this anomaly by moving the CCD into a plane P' containing the points A' and B'. The effect of this compensation is to increase the overall depth of field of the optical system because the corresponding focussing defect is compensated.

For an inclination $\alpha$ (FIGS. 1 and 7) of the optical axis to the vertical of 45° the optimum tilt angle $\beta$ is in the order of 7°, this value depending on the lens, the size of the CCD, the size of the field and various other parameters.

FIGS. 8 through 10a, 10b, 10c, and 10d illustrate another aspect of the invention concerning analysis of the signal supplied by the CCD 232.

FIG. 8 is a diagram showing the (analog) video signal V(t) produced for each scanning line of the CCD and shows, between two synchronization pulses, a signal whose amplitude varies according to the received luminous energy; this signal represents the trace of the laser beam.

The purpose of the circuit is to determine the position of the laser trace relative to the start of the line, i.e. the position of the energy peak representing the trace (in other words, the value $\sigma$ representing the time elapsed from the video signal line synchronization pulse). The problem is that in practise the trace is not in the form of a sharp peak but features some spreading due to the oblique angle of incidence of the beam to the part, diffraction phenomena, various kinds of interference, etc.

Various techniques have been put forward for determining unambiguously the position of the trace.

For example, one way is to set a threshold T and to define the position of the trace as the time half-way between the two crossings of this threshold, once in each direction. However, this technique assumes that the spread of the signal is more or less symmetrical and is difficult to implement because of the highly variable character of the threshold required.

Another technique is to differentiate the video signal and to define the position of the trace as the point at which the sign of the derived signal changes. As with the previous technique, this technique has the disadvantage of assuming a substantially symmetrical signal spread and has the further drawback, inherent to any signal processing involving differentiation, of amplifying the effects of noise and various forms of interference.

The invention proposes to use another technique, essentially consisting in integrating the video signal and defining the position of the trace as the mid-point of the video signal energy, in other words the location at which (see FIG. 10a) the areas $S_1$ and $S_2$ are equal.

A first advantage of this technique is its high noise immunity due to the use of integration.

Furthermore, it can be implemented by means of an extremely simple analog electronic circuit as shown in FIG. 9.

This circuit essentially comprises an integrator stage 241 receiving at its input the video signal V(t) (line (a) of the FIG. 10 timing diagram) and supplying at its output an integrated signal $S(t) = \int V(t)$ (the integrator is reset by the video signal line synchronization pulse).

The signal S(t) is applied to two separate branches 242 and 243. The branch 242 comprises a simple voltage divider delivering at the output the signal S(t)/2 whose amplitude is half that of the signal S(t). The branch 243 includes a delay line, preferably a programmable delay line, retarding the signal S(t) by a time $\tau$ so that the output signal is the signal $S(t-\tau)$. The two signals obtained in this way are respectively shown in lines (b) and (c) of the FIG. 10 timing diagram. They are then applied to respective inputs of a comparator 244 which changes state immediately (to the nearest time period $\tau$) $S(t)/2 = S(t-\tau)$, in other words when the areas $S_1$ and $S_2$ are equal. Line (d) of the FIG. 10 timing diagram shows the signal $\Sigma$ (t) at the output of the comparator 244.

The delay $\tau$ of the delay line 243 is chosen to be at least equal to the widest video signal representing the laser trace that may be encountered, which means that it must be chosen according to the maximum foreseeable spreading of the trace. A value of 50 to 100 ns is usually satisfactory.

It is also possible to implement this process digitally, as will now be described with reference to FIGS. 11a and 11b and 12.

In this case the analog video signal V(t), one example of which is shown in FIG. 11a, is first digitized by means of an analog/digital converter (ADC) 245 which may be incorporated into the sensor (improving noise immunity) or even into the camera itself in the case of a component with a direct digital output.

The digital signal $B_i(t)$ obtained, shown in FIG. 11b, comprises for each video line a series of successive samples of value $B_i$, this value usually being digitized on eight bits. The first non-null sample is the Pth sample and the last is the Qth sample. The processing carried out involves determining the Mth sample corresponding to the mid-point of the video signal energy (that is to say the point at which the areas $S_1$ and $S_2$, after digitization, are equal) and determining the position of this energy mid-point within the Mth sample, that is to say the value m shown in FIG. 11b which is between 0 and 100%.

This value m is determined as follows:

The total energy $\Sigma$, that is to say the surface area of the shaded areas I through IV in FIG. 11b, is:

$$\Sigma = \sum_{P}^{Q} B_i$$

If the energy mid-point is on the sample of rank M (where $P < M < Q$), then the following equation expresses the fact that the surface area of the areas I+II is equal to the surface area of the areas III+IV:

$$\sum_{P}^{M-1} B_i + m \cdot B_M = (1 - m) \cdot B_M + \sum_{M+1}^{Q} B_i$$

This may be written:

$$m \cdot B_M = \Sigma/2 - \sum_{P}^{M-1} B_i$$

The digital signal $B_i$ at the output of the converter 245 is applied to an accumulator register (ACC) 241 (exercising the same function as the same-numbered integrator stage in the analog implementation), this accumulator constituting a real time adder whose output is a signal of energy $\Sigma$ increasing with time (analogous to the signal shown in FIG. 10b in the analog version). Note that the sequence of operations begins only when a non-null sample is received, that is to say the Pth sample, whose appearance at the output of the converter 245 initializes and triggers a sequencer circuit 246 controlling timing of the various digital stages of the circuit.

The energy signal $\Sigma$ at the output of the accumulator 241 is applied to a divider by two 242 which supplies a signal $\Sigma/2$ (in this digital embodiment division by two is achieved simply by a one-bit shift to the right, and therefore by simple and appropriate hardwiring) and to a shift register 243 which provides a time-delay stage. The size of the delay register is chosen to be at least equal to the largest number of pixels of the video trace likely to be encountered, to avoid any possibility of saturation.

The output of the divider 242 and that of the register 243 are connected to two inputs of a subtractor circuit (SUB) 244 used as a comparator: the result of the subtraction becomes negative immediately:

$$m \cdot B_M > \Sigma/2 - \sum_{P}^{M-1} B_i \quad (1)$$

i.e. immediately the energy mid-point is passed.

In other words, at this time (to the nearest time-delay introduced by the register 243) the current sample is the sample of rank M.

This change of state is detected by a status bit S which changes value to indicate that there is available at the output of the subtractor 244 the value:

$$\Sigma/2 - \sum_{P}^{M-1} B_i$$

This is the value $m \cdot B_M$ from equation (1).

The value $B_M$ is known from elsewhere, for example at the output of a shift register 248 the same size as the register 243 and receiving at its input the successive samples $B_i$.

Rather than using digital division to obtain the required value m from the product $m \cdot B_M$ (the other required value M, that is to say the rank of the sample containing the energy mid-point, being given directly by the counting logic of the sequencer 246), a solution which is difficult and costly to implement in real time, preference is given to the use of a 64 kbytes memory (MEM) 247 containing the 216 possible values of m each coded on one byte as a function of $m \cdot B_M$, on the one hand, and of $B_M$, on the other hand. This latter data, each on one byte, is applied to the address inputs $A_1$, $A_2$ of the memory 247.

When the circuit 244 changes state the value $m \cdot B_M$ at the output of this circuit is applied to the input $A_1$ and the value $B_M$ is applied to the input $A_2$: the required value m is therefore found immediately and directly at the data output D.

It can be seen that this specific implementation of the circuit enables calculation in real time of the position of the energy mid-point of the video signal with great accuracy (in the order of one tenth a resolution pixel or better).

There is claimed:

1. An optical sensor for three dimensional shapes having a laser that produces a lamellar plane beam illuminating the surface of an object so as to produce thereon a curvilinear luminous trace scanned by at least one video camera, said camera producing information converted into digital data representing pixel coordinates, the sensor comprising:

a lightbox having in a common housing adapted to be disposed a short distance above the object to be scanned:

a laser source that produces a collimated rectilinear beam;

optical means for converting said rectilinear beam into a lamellar plane beam;

means for lengthening the optical path of said lamellar plane beam comprising two fixed plane mirrors in face to face relationship to produce a plurality of reflections between a beam entry point and a beam exit point;

whereby the short distance between said housing and said object is compensated by a virtual optical distance so that there is a correlative increase in the depth of field of the usable region of said lamellar plane beam at an exit from said housing;

at least one detector unit adjoining said lightbox and provided with a photo-electric image analyzer device and objective lens means in front of said image analyzer device;

an electronic circuit for extracting data representing the position of said trace of said laser beam on each image line produced by said image analyzer device, the electronic circuit including:

an integrator stage receiving at its input an electrical signal representing luminous energy received by said detector unit, said luminous energy varying along the image line, said integrator stage delivering at its output an increasing signal representing an accumulation of the received luminous energy;

a divider stage receiving at its input the energy signal supplied by said integrator stage;

a time-delay stage receiving at its input the energy signal supplied by said integrator stage; and a comparator stage receiving on respective inputs the output signals of said divider stage and said time-delay stage, a change of state of said comparator stage defining the position of the mid-point of the trace of the laser beam on the image line.

2. Sensor according to claim 1 wherein said beam entry point and said beam exit point comprise optical means for adjusting the beam angle of incidence to vary the number of reflections between said two mirrors in face to face relationship.

3. Sensor according to claim 1 wherein said optical means for converting said rectilinear beam into a lamellar plane beam are static means.

4. Sensor according to claim 1 further comprising means for tilting said image analyzer device relative to said objective lens means.

* * * * *